United States Patent [19]

Nakayama

[11] Patent Number: 4,633,305
[45] Date of Patent: Dec. 30, 1986

[54] METHOD OF RECORDING IMAGE SIGNALS OF PHOTOGRAPHIC PICTURES

[75] Inventor: Keiji Nakayama, Kanagawa, Japan

[73] Assignee: Fuji Photo Film Co., Ltd., Japan

[21] Appl. No.: 797,904

[22] Filed: Nov. 14, 1985

[30] Foreign Application Priority Data

Nov. 19, 1984 [JP] Japan ................................. 59-244196

[51] Int. Cl.⁴ ......................... H04N 7/18; H04N 5/781
[52] U.S. Cl. ...................................... 358/101; 83/521; 358/76; 358/102
[58] Field of Search ................. 358/101, 102, 106, 76, 358/93; 83/520, 521

[56] References Cited

U.S. PATENT DOCUMENTS

| | | | |
|---|---|---|---|
| 4,037,249 | 7/1977 | Pugsley | 358/76 |
| 4,086,836 | 5/1978 | Jensen | 358/93 |
| 4,146,907 | 3/1979 | Jensen | 358/101 |
| 4,442,453 | 4/1984 | Verdier | 358/102 |
| 4,506,300 | 3/1985 | Fearnside | 358/102 |

Primary Examiner—Howard W. Britton
Attorney, Agent, or Firm—Parkhurst & Oliff

[57] ABSTRACT

A method of magnetically recording photographic pictures into a magnetic disc contained in a magnetic disc pack. According to this method of recording image signals of the photographic pictures, the photographic pictures formed on a roll-shaped print are successively taken by a video camera before being cut from one frame to another, and the image signals of the photographic pictures are magnetically recorded into a magnetic disc. In consequence, the flow of the existing photographic processing laboratory system is not impaired. Further, photographed subjects of the video camera are not separated from one another, so that the photographed subjects can be processed easily at the time of video taking.

6 Claims, 5 Drawing Figures

METHOD OF RECORDING IMAGE SIGNALS OF PHOTOGRAPHIC PICTURES

BACKGROUND OF THE INVENTION

1. Field of the Invention

This invention relates to a method of recording image signals of photographic pictures, and more particularly to a method of recording image signals of photographic pictures, wherein the photogrpahic pictures formed on a roll-shaped print are taken by a video camera and recorded on a recording medium such as a magnetic disc.

2. Description of the Prior Art

Along with the spread of the video camera in recent years, there has been utilized a so-called video television album wherein, photographed subjects such as photographic negatives, prints and the like are recorded in a magnetic disc for an electronic camera, a video tape and the like for the storage, reproduced by a reproducer as necessary, and images are projected on a screen of a television for the entertainment. Along with this, such a service will become available that, similarly to the photographic print service, photographic pictures such as negatives are taken in a photographic processing laboratory (hereinafter referred to as a "labo"), recorded in a magnetic disc and the like, and the magnetic disc thus recorded is delivered to customers. However, a problem is raised in what process the image signal of the photographic picture should be recorded in the magnetic disc during processes of manufacturing of a print. Namely, there is such a disadvantage that, in recording the photographic pictures into the magnetic disc, a negative-positive inversion circuit becomes necessary.

On the other hand, in recording the photographic pictures from finished prints into the magnetic disc, the following disadvantage is raised. More specifically, the photographed subjects are separated of one another, the positioning works of the photographed subjects (prints, for example) to the video camera are required during recording and, each of the prints should be set at a photographing position, whereby this method of recording is not suitable for the bulk processing of the records of photographic pictures.

SUMMARY OF THE INVENTION

The present invention has been developed to obviate the above-described disadvantages of the prior art and has as its object the provision of a method of recording image signals of photographic pictures, capable of recording the photographic pictures easily and in the bulk processing.

To this end, the present invention contemplates that, in processes of manufacturing photographic pictures, wherein photographed films are developed to provide negatives, the photographic pictures are printed into a roll-shaped print paper from the negatives, the roll-shaped print paper is print-developed as in the roll shape to provide a roll-shaped print recorded thereon with the photographic pictures, and this roll-shaped print is cut into respective frames, the photographed pictures formed on the roll-shaped print are successively taken by a video camera before the roll-shaped print is cut into form one frame to another, whereby image signals of the photographic pictures are recorded into a recording medium.

BRIEF DESCRIPTION OF THE DRAWINGS

The exact nature of this invention, as well as other objects and advantages thereof, will be readily apparent from consideration of the following specification relating to the accompanying drawings, in which like references characters designate the same or similar parts throughout the figures thereof and wherein.

DETAILED DESCRIPTION OF THE INVENTION

Detailed description will hereunder be given of the preferred embodiment of a method of recording the image signals of the photographic pictures according to the present invention with reference to the accompanying drawings.

Figure 1:
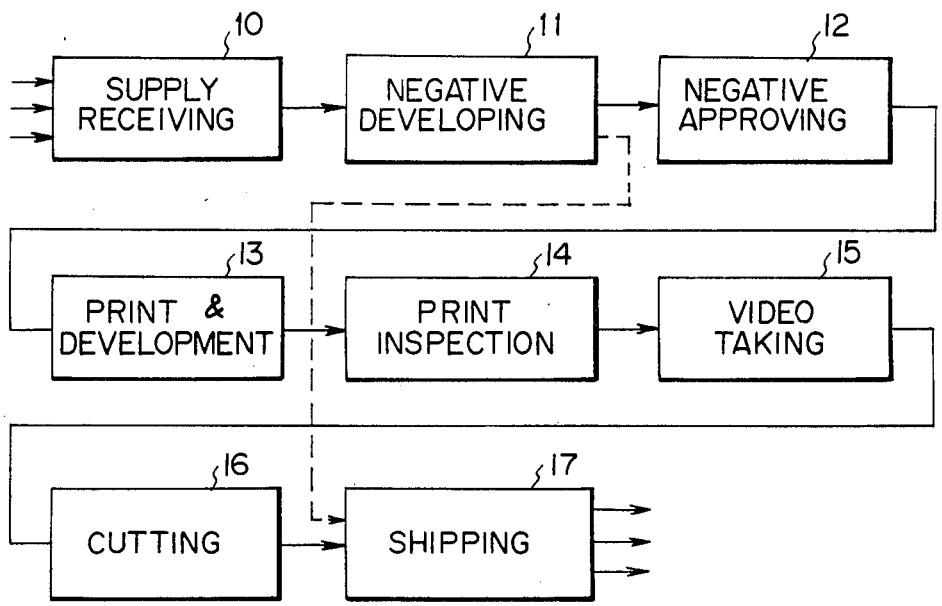
FIG. 1 is a flow sheet showing the method of recording the image signals of photographic pictures according to the present invention.

FIG. 1 is a flow sheet showing the method of recording the image signals of the photographic pictures according to the present invention. Firstly, during a supply receiving process 10, film magazines containing the photographed films are collected from respective Development and Print Shops. During this supply receiving process 10, the magazines are assorted in accordance with the orders from customers (the simultaneous printing, the development of only the negatives the use of silk grains, the use of luster, and the like), film manufacturers and the like. After the magazines are assorted during the supply receiving process 10, check lavels (Identity (ID) Nos.) for the checkup being equal to each other are attached to an order bag and the forward end of the photographed film, which are delivered to a succeeding negative developing process 11. During the negative developing process 11, scores of unit films taken out of the film magazines are spliced to one another, to provide a long film. The long film thus spliced is developed by a negative processor. The long negative thus developed in the negative developing process 11 is negative-approved in the succeeding negative approving process 12. During the negative approving process 12, the long negative is judged by a negative approving device as to whether the negative is printable or not, and thereafter, the respective frames are subjected to density compensation, color compensation and the like corresponding thereto. More specifically, if the negative is printable, then in the negative approving device, notches are directly formed on the side edges of each frame of the long negative and data of the density compensation, color compensation and the like are inputted to a paper tape separately thereof.

Figure 4:
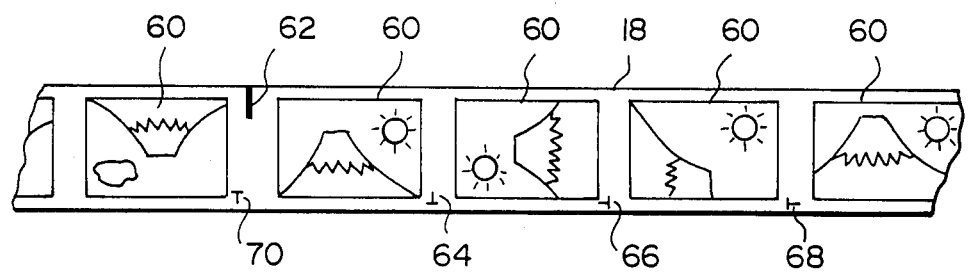
FIG. 4 is a view showing an example of a long print produced under the method of recording the image signals of the photographic pictures according to the present invention.

At this time, it is sensed that in what directions the pictures in the frames of the long negative are taken relative to the predetermined direction, e.g. the forward direction in which the long negative is sent, and the data of the directions (hereinafter referred to as "normal position", "positions turned to the sides" and "inverted position") are inputted to the paper tape, During a pring developing process 13, the long negative is exposed to a roll-shaped print paper by a printer on the basis of the data inputted during the negative approving process 12. More specifically, in the printer, confirmation is made as to whether the long negative is printable or not through the notches directly formed on the long negative, each of the frames of the photographic pictures is printed on the roll-shaped paper by the printer, while being corrected on the basis of data of the paper tape inputted thereto with the density compensation, the color compensation and the like, the data of the normal position, positions turned to the side and inverted position are printed in outer frames (white frames) of the photographic pictures as shown in FIG. 4, and thereafter, developed by a print developer. In other words, FIG. 4 shows the roll-shaped print paper 18, which has been printed and print-developed. On the roll-shaped print paper 18, there are printed the photographic pictures 60, a customer mark 62 attached in association with the completion of printing of one unit film whereby one unit film is associated with the printing, and marks 64 to 70 which indicate the normal position, positions turned to the sides and inverted position. In this embodiment, the four directions of T-shaped marks indicate the normal position 64, the position turned through 90° to the left 66, the position turned through 90° to the right 68 and the inverted position 70 of the frames, respectively. Here, the marks indicating the normal position, the positions turned to the sides and the inverted positions need not necessarily be attached to the positions identical with one another relative to the photographic pictures in this embodiment, the marks can be attached to whatever positions only if the four directions can be discriminated, and the marks need not necessarily be limited to the T-shaped marks. The customer mark 62 is used for the discrimination of the customers and functioning of associating one unit film with the printing, and moreover, instructing the replacement of the magnetic disc, etc. for recording the image signals of the photographic pictures as will be described hereinafter according to the present invention. Additionally, the roll-shaped long negative which has finished the printing during the print developing process 13 is cut by a negative cutter into units of six frames for example, and enclosed into a bag (negative sheath) enclosing therein one negative.

The print developing process 13 is followed by a print inspecting process 14, where the roll-shaped print is unwound, whereby inspection for reprinted frames, unnecessary frames, etc. due to the defectives is carried out.

Figure 5:
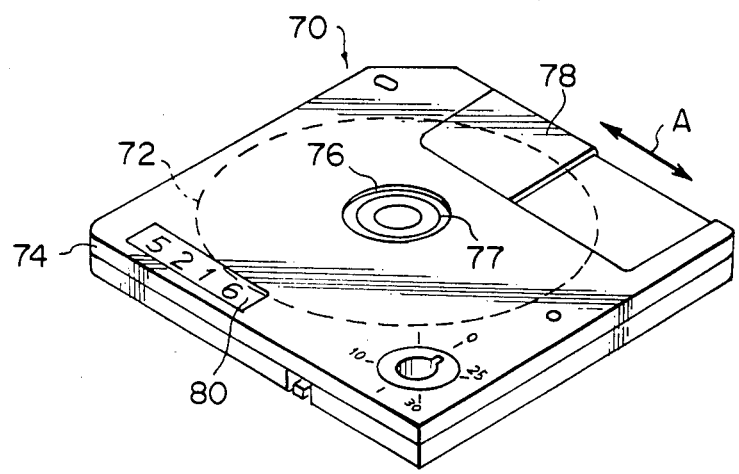
FIG. 5 is a perspective view showing the magnetic disc as being an example of the recording medium used in the method of recording the image signals of the photographic pictures according to the present invention.

The respective photographic pictures printed on the roll-shaped print paper are magnetically recorded into the magnetic disc for an electronic camera and attached thereto with ID No. associated with the magnetic disc in a succeeding video taking process 15. In this case, the recording into the magnetic disc is performed, excluding the reprinted frames, the unnecessary frames and the like which have been checked in the preceding print inspecting process 14. FIG. 5 shows a magnetic disc pack 70 used in this embodiment. This disc pack 70 is constituted by a thin and small-sized magnetic disc 72 for recording the image signals and a shell 74 for rotatably receiving this magnetic disc 72. The shell 74 is formed at the substantially central portion thereof with a circular opening 76, through which is exposed a core 77 provided at the center of the magnetic disc pack 70. The disc pack 70 is provided thereon with a shutter 78 movable in directions in parallel to one side of the disc pack 70 as indicated by a double-headed arrow A. In this shutter 78 is moved to a position opposite to the position as shown, then an opening of the shell 74, which is positioned under the shutter 78 is exposed, whereby a magnetic head of a recording-reproducing device, not shown, is approached or brought into contact with the magnetic disc 72, so that the image signals can be recorded or reproduced.

An ID No. 80 being equal in number to the order bag or the negative is attached by use of a check level, printing or the like onto the shell 74 upon completion of the recording the image signals of the photographic pictures into the disc pack 70. Furthermore, FIG. 2 shows a device for recording the image signals of the photographic pictures as used during the video taking process 15, which will be described hereunder.

After being magnetically recorded during the video taking process 15, the roll-shaped print is cut from one frame to another by a paper cutter during a paper cutting process 16.

The negative and print thus cut and further the magnetic disc having magnetically recorded thereto the photographic pictures and attached thereto the ID No. associated therewith during the video taking process 15 are checked with the order bag associated therewith in reference to the ID No., and shipped to the Development and Print Shops during a shipping process 17. In the case of only the negative development, the negative is forwarded directly from the negative developing process 11 to the shipping process 17 is indicated by a broken line.

Figure 2:
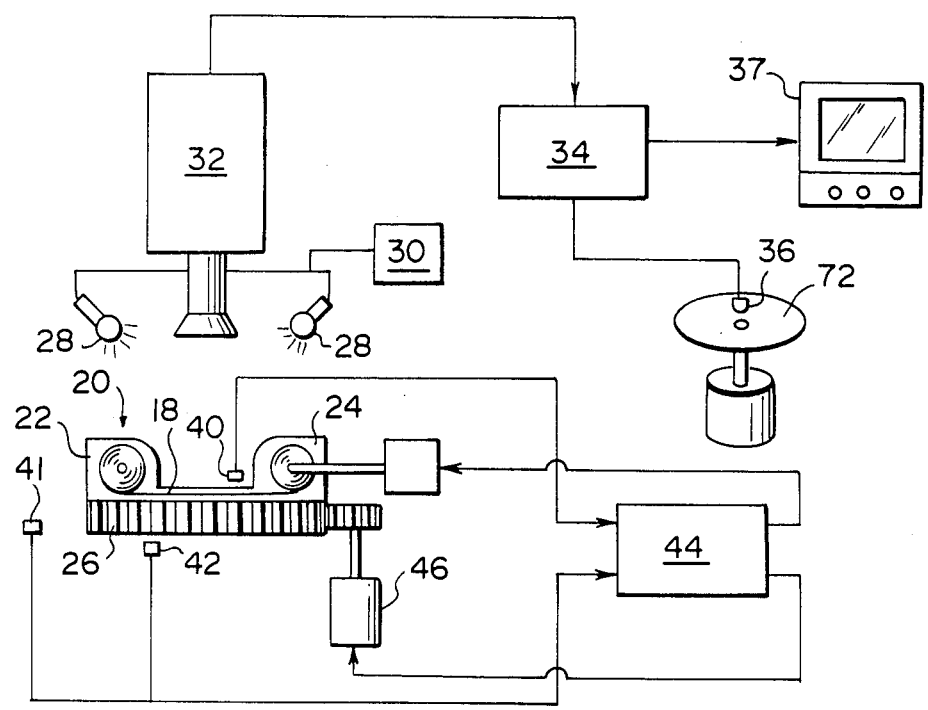
FIG. 2 is a schematic circuit arrangement diagram of a device used in the method of recording the image signals of the photographic pictures according to the present invention.

FIG. 2 is a block diagram showing the schematic construction of the device for recording the image signals of the photographic pictures as used in this embodiment. A print paper carrier 20 is constituted by a supply section 22 and a takeup section 24. The print paper 18 is delivered from the supply section 22 and taken up by the takeup section 24. The abovementioned print paper carrier 20 is rested on a rotary table 26, and further light sources 28 and 28 are disposed above the rotary table 26. The light sources 28 are connected to a power source 30 and illuminate the print paper 18 from above the rotary table 26. Disposed above the print paper carrier 20 is a video camera 32, which takes the photographic pictures on the print paper 18 being conveyed by the print paper carrier 20. The video camera 32 reduces the taking magnification in the case of the positions turned to the sides as compared with the case of the normal position, so that the picture as a whole can be displayed on a screen of a television. The image signals taken by the video camera are processed by an image circuit 34 and recorded into the magnetic disc from one track to another through the magnetic head 36. At the same time, the recording conditions are displayed by a monitor television 37. Disposed above the print paper carrier 20 is a print detecting sensor 40 which reads the marks formed on the white frames of the print paper 18, and detects a frame feed stop position of the print, the types of the print such as the luster and the silk grains, and whether the frame of the film is taken at the normal position, the positions turned to the sides or the inverted positions. These marks are optically formed at the time of printing as described above. Furthermore, there are provided position sensors 41 and 42 for sensing the stopped position of the rotary table 26. Detection signals from the print detecting sensor 40, the position sensors 41 and 42 are delivered to a control section 44, which forwards the print paper 18 and rotates the rotary table 26 to thereby control the print paper 18 in direction in response to these signals.

Additionally, the video camera 32 may be rotated instead of the rotary table to control the taken frames formed on the print paper 18 in direction.

Action of the embodiment of the present invention, having the above-described arrangement will be described hereunder.

During the video taking process 15, the print paper 18 is delivered from the supply section 22 to the takeup section 24. In this case, the print paper 18 is delivered from one frame to another, taken at a taking position by the video camera 32, the rsultant image signal is recorded into the magnetic disc 72 through the image circuit 34 and the magnetic head 36. In this case, when the sensor 40 judges that the frame of the print is in the position turned to a side by the mark formed on the white frame of the print paper 18, a signal is delivered from the control section 44 to a driving motor 46, whereby the driving motor 46 is actuated to rotate the table 26 through 90°. If the rotary table 26 is rotated, then the carrier 20 rested on the rotary table 26 is rotated, whereby the frame of the print is rotated through 90°, so that the image signal recorded into the magnetic disc 72 is recorded in the normal position.

Furthermore, in taking at the positions turned to the sides, there are cases where the taken pictures are inverted relative to each other depending upon the types of cameras. Further, in taking at the normal positions, there are cases where the taken pictures are inverted relative to each other depending upon the types of cameras and the taking postures of the photographer. In order to deal with all of the cases described above, it is necessary to rotate the rotary table through 270°. In this embodiment, since the carrier 20 is formed into a magazine as shown in FIG. 2, the rotary table 26 is freely rotatable, so that the print can be set at the proper position.

Figure 3:
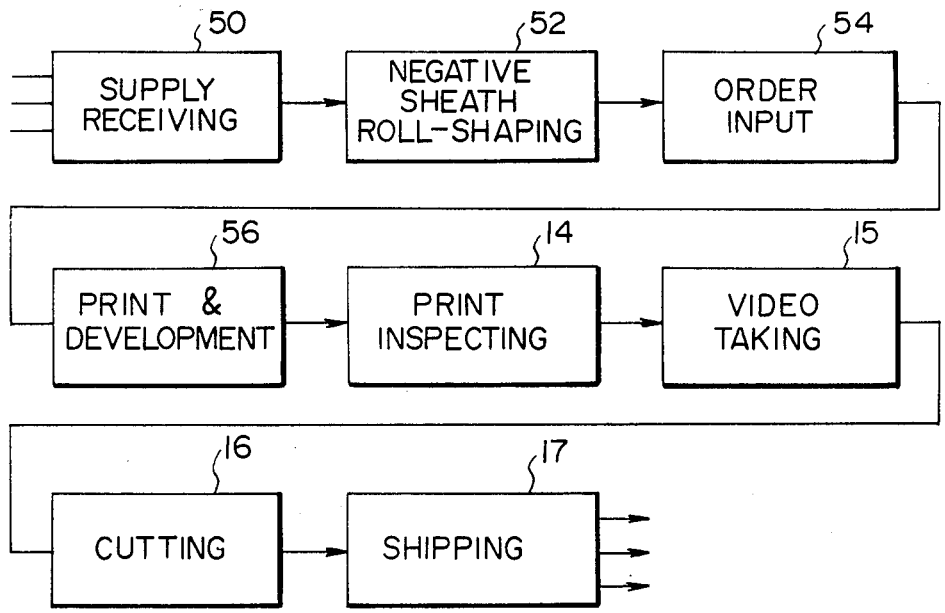
FIG. 3 is a flow sheet showing the case where the method of recording the image signals of the photographic pictures according to the present invention is applied to a reprint process.

FIG. 1, shows the flow sheet of the simultaneous printing, while FIG. 3 illustrates the flow chart of the reprinting. More specifically, during the supply receiving process 50, the negative sheaths collected from the respective Development and Print shops are assorted in accordance to the orders of customers and the film manufacturers, and ID Nos. are attached to the order bags and the negative sheaths in the same manner as in the case of the simultaneous printing.

The negative sheaths assorted in accordance with the film manufacturers, etc. are adhesively attached to a sheet film by a unit of scores of the negative sheaths, and wound into a roll during a negative sheath roll-shaping process 52.

The unit of scores of sheaths thus wound into the roll shape is inputted thereto with a print ordered frame number, the number of prints, the negative compensation data and the like during a succeeding order input process 54. More specifically, during the order input process 54, the ordered frame specifying, the number of prints and the compensation data such as the density compensation and color compensation are read through the roll-shaped negative sheath and inputted to the paper tape, separately. Subsequently, during a print developing process 56, each of the negatives is drawn out of the negative sheath and printed on a roll-shaped print paper. In this case, the printing is carried out by a printer, with the density compensation and the color compensation being made on the basis of the data on the paper tape, previously inputted during the order input process 54.

Additionally, the print inspecting process 14, the video taking process 15, the cutting process 16 (excluding the cutting of the negatives) and the shipping process 17 are similar to those in the case of the simultaneous printing, so that the same reference numerals are used and the description thereof is omitted.

Here, in this embodiment, the sensing of the normal position, the positions turned to the sides and the inverted position of the photographic pictures formed on the print paper are carried out during the negative approving process 12, so that the video taking process 15 can be entirely automated. On the other hand, the sensing of the normal position, the positions turned to the sides and the inverted position may be carried out during the video taking process 15, not during the negative approving process 12. In this case, the sensing of the normal position, the positions turned to the sides and the inverted position may be performed easier on the print or the monitor television than in the state of the negatives.

As has been described hereinabove, in the method of recording the image signals of the photographic pictures according to the present invention, the photographic pictures formed on the print paper wound into the roll shape are taken by the video camera and recorded into the magnetic disc, so that the photographic pictures can be accurately positioned relative to the video camera with no use of a continuous photographic mount for the exclusive use. Because of this, the words of recording the image signals of the photographic pictures can be very easily automated. Furthermore, the photographic pictures formed on the roll-shaped print paper are the completed color pictures undergone the compensations such as the density compensation and the color compensation, and such color pictures are taken by the video camera, so that necessity of troublesome compensations at the time of recording into the magnetic disc after the photographic pictures are taken by the video camera is eliminated. Further, differing from the video taking from the negatives, necessity of providing the negative-positive inversion circuit at the time of recording after the photographic pictures are taken by the video camera is eliminated, so that the device for recording the image signals of the photographic pictures can be simplified in construction.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of recording image signals of photographic pictures, wherein said photographic pictures are printed onto a roll-shaped print paper from negatives, said roll-shaped print paper is print-developed in a state of a roll shape to provide a rolled shaped print recorded therein with said photographic pictures, and said roll-shaped print is cut from one frame to another, characterized in that said photographic pictures formed on said roll-shaped print are successively taken by a video camera before being cut from one frame to another, and the image signals of said photographic pictures are recorded into a recording medium.

2. A method of recording image signals of photographic pictures as set forth in claim 1, wherein said recording medium is a magnetic disc.

3. A method of recording image signal of photographic pictures as set forth in claim 2, wherein said magnetic disc is rotatably received in a shell.

4. A method of recording image signals of photographic pictures, comprising:
   a supply receiving process, during which photographed films are assorted in accordance with film manufactures, orders of customers and the like, and numbers for the checkup are attached to order bags and the forward ends of the films;
   a negative developing process, during which scores of photographed films taken out of each of film magazines are spliced to one another, and developed;
   a negative approving process, during which judgment is made as to whether said developed negatives are printable or not, and density compensation and color compensation are made;
   a print developing process, during which the photographic pictures are print-developed onto a roll-shaped paper;
   a print inspecting process, during which inspection for defective frames are amde while said roll-shaped print thus print-developed is being unwound;
   a video taking process, during which the photographic pictures formed on the roll-shaped print are magnetically recorded into a magnetic disc in a magnetic disc pack, and numbers associated with said order bags and said films are attached to said magnetic disc pack;
   a cutting process, during which said roll-shaped prinit is cut from one frame to another and separated from one another; and
   a shipping process, during which said negative, said print and said magnetic disc pack, which are associated with one another, are checked with one another is number, and received into the order bag associated therewith.

5. A method of recording image signals of photographic pictures as set forth in claim 4, wherein data of a normal position, positions turned to the sides and an inverted position, are printed in outer frames of each of frames of said roll-shaped print, said roll-shaped print or a video camera is rotated on the basis of said data during a video taking process, and thereafter, magnetical recording is carried out.

6. A method of recording image signals of photographic pictures, comprising:
   a supply receiving process, during which negative sheaths are assorted in accordance with types such as film manufactures, orders of customers and the like, and numbers for the checkup are attached to order bags and said negative sheaths;
   a negative sheath roll-shaping process, during which scores of said assorted negative sheaths are adhesively attached to a sheet film and wound into a roll shape;
   an order input process, during which ordered frame specifying, number of prints, compensation data such as density compensation and color compensation are read from said negative sheaths thus wound into the roll shape and said data are inputted into a paper tape;
   a print developing process, during which negatives are drawn out of said negative sheaths and photographic pictures are print-developed into a roll-shaped print paper;
   a print inspecting process, during which inspection defective frames are made while said roll-shaped print thus print-developed is unwound;
   a video taking process, during which each of said photographic pictures formed on said roll-shaped print is magnetically recorded into a magnetic disc contained in a magnetic disc pack and numbers associated with said order bags and said negative sheaths are attached to said magnetic disc pack;
   a cutting process, during which said roll-shaped print is cut from one frame to another to be separated from one another; and
   a shipping process, during which said negative sheath, said print and said magnetic disc pack, which are associated with one another, are checked up in number with one another and put into order bag associated therewith.

* * * * *